United States Patent [19]

Juhl et al.

[11] Patent Number: 5,051,266

[45] Date of Patent: Sep. 24, 1991

[54] MEAT-ADHERING MULTILAYER FILM

[75] Inventors: Roger L. Juhl, Countryside; Jeffrey M. Schuetz, Woodridge; Stanley Lustig, Park Forest, all of Ill.

[73] Assignee: Viskase Corporation, Chicago, Ill.

[21] Appl. No.: 444,588

[22] Filed: Dec. 1, 1989

[51] Int. Cl.$^5$ .................. B65D 85/00; B32B 27/00
[52] U.S. Cl. ................... 426/129; 428/35.4; 428/520
[58] Field of Search ............... 426/127, 129; 428/35.4, 428/520

[56] References Cited

U.S. PATENT DOCUMENTS

| | | | |
|---|---|---|---|
| 3,365,520 | 1/1968 | Foster et al. | 525/221 |
| 4,164,589 | 8/1979 | Kadane et al. | 426/265 |
| 4,303,711 | 12/1981 | Erk et al. | 426/130 |
| 4,724,186 | 2/1988 | Kelch | 428/520 |
| 4,762,748 | 8/1988 | Oberle | 428/520 |
| 4,784,863 | 11/1988 | Lustig et al. | 426/113 |
| 4,801,486 | 1/1989 | Quacquarella et al. | 428/520 |
| 4,837,084 | 6/1989 | Warren | 428/520 |
| 4,863,768 | 9/1989 | Ishio et al. | 428/34.9 |
| 4,888,223 | 12/1989 | Sugimoto et al. | 426/129 |

FOREIGN PATENT DOCUMENTS 55-131033  10/1980  Japan.
64-14032   1/1989   Japan.

OTHER PUBLICATIONS

"PRIMACOR® 1410-XT Polymer for Blown and Cast Film" Dow Chemical U.S.A., Midland, Mich., 4-6-89.

Primary Examiner—Donald E. Czaja
Assistant Examiner—A. J. Weier
Attorney, Agent, or Firm—John C. LeFever

[57] ABSTRACT

A flexible tube of multilayer film having an inner layer formed of a blend comprising EVA and an unneutralized copolymer of the ethylene acrylic acid type. At least the inner layer is irradiated. The tube is used for insitu cooking of encased meat by an aqueous bath, with resulting improved adhesions between the cooked meat outer surface and the film inner surface.

38 Claims, No Drawings

MEAT-ADHERING MULTILAYER FILM

BACKGROUND OF THE INVENTION

This invention relates generally to a multilayer film, a meat product package comprising an enclosing multilayer film and an insitu aqueous medium—cooked meat product, i.e., the cook-in type, and a method for preparing a cooked meat product. In the method of the invention the meat is placed in a flexible tube formed of this film, hermetically sealed and insitu cooked by an aqueous medium. During the insitu cooking, the film is against the meat outer surface in contiguous adhering relation therewith.

There are numerous requirements for a multilayer cook-in shrink film including: delamination resistance, low oxygen permeability, and high temperature strength. For certain end uses as for example packaging of chunked and formed meat products for cook-in, the film should provide heat shrinkability representing about 30–50% shrinkability at about 90° C. Another very desirable characteristic for meat cook-in shrink films is adherence to the meat outer surface thereby preventing "cook-out", which is the collection of juices between the meat outer surface and film inner surface.

Probably the most commonly used inner layer in multilayer barrier-type shrink films is ethylene vinyl acetate. However, the prior art has recognized that ethylene vinyl acetate does not provide good meat adhesion. For example, Judd et al U.S. Pat. No. 4,463,778 teaches that regenerated cellulose casings may be internally treated with vinyl acetate polymer to produce a coating which causes the casing to adhere to dry sausage emulsion and follow the sausage shrinkage during curing, but provide a low level of meat adhesion. In this manner the coating readily releases from the dried sausage emulsion when the casing is separated therefrom.

Because of the notoriously poor adhesion of ethylene vinyl acetate to meat, the prior art has employed various coatings or layers between an EVA substrate and the meat to provide good adhesion. Also, the prior art has developed a number of multilayer plastic cook-in films and certain of these are in commercial use. For example Bieler et al U.S. Pat. No. 4,104,404 describes a ten layer film comprising four central nylon layers, an ionomer layer on each outer side of the central layers, and two outer polyethylene layers on each outer side of the ionomer layers. The patentee demonstrates that delamination of the outer polyethylene layer under cook-in conditions was only avoided by irradiation dosage of the entire multilayer film at a level of at least 6 MR. This film does not appear to provide high meat adhesion.

Another commercially employed cook-in film is the type described in Oberle et al U.S. Pat. No. 4,469,742, also comprising six layers irradiated to dosage of at least 6 MR. The central barrier layer is hydrolyzed ethylene-vinyl acetate copolymer (EVOH), chosen because of its higher softening point and superior oxygen barrier properties as compared to the saran-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5–12 wt.%. The innermost (heat sealing) layer may for example be a propylene-ethylene random copolymer (PER). If meat adhesion is required, an additional ionomer layer is used as the innermost layer.

One general concern in the extrusion manufacture of multilayer films containing EVOH is that the process conditions be such that gel formation is avoided. This may occur if resins are retained in the extruder passages and exposed to heat for prolonged periods so as to form oxidized particles which ultimately cause bubble breakage or appear in the finished film.

It will be apparent from the foregoing that these prior art cook-in films are complex both in terms of multiple materials and sophisticated manufacturing techniques ie. six layers and relatively high irradiation dosage level to avoid delamination. Further, some of these films do not provide meat adhesion and an additional layer is needed for this specific purpose.

Lustig et al U.S. Pat. No. 4,784,863 describes a multilayer film requiring only three layers but which overcomes many of the limitations of these earlier films requiring at least six layers. This film comprises an outer layer, a core-barrier layer and an inner EVA layer having on its inner surface at least about 4 grams/1000 ft.$^2$ of starch particles with major dimensions less than about 100 microns and being substantially uniformly dispersed across this inner surface and integral therewith. At least the dispersed starch particle-containing EVA inner surface is irradiated at dosage of at least 2 MR, preferably less than 5 MR. When used in a meat product package this film inner surface has good meat adhesion and little fat-out for most meats including premium grade boiled ham having less than about 10% fat and usually less than about 5% high collagen meat protein of the total available meat protein. Unfortunately when the meat to be cooked insitu is a commodity style boiled ham having a product composition of more than about 10% fat and usually more than about 5% high collagen meat portion of the total available meat portion, the irradiated dispersed starch particle-containing EVA inner layer-to-meat adhesion is only marginally satisfactory.

An object of this invention is to provide a flexible tube formed of multilayer film having less than six layers and with an inner layer providing improved adhering relation to high fat and/or high collagen type meat product during insitu cooking in an aqueous medium.

Another object is to provide a meat product package including an insitu aqueous medium-cooked meat product with its outer surface in improved adhering relation to the inner layer of a multilayer film having less than six layers and which satisfies the other requirements of a cook-in film.

Another object is to provide a method for preparing an insitu cooked high fat and/or high collagen meat product in a flexible tube having less than six layers, with improved adhering relation between the meat outer layer and film inner layer.

Other objects and advantages will be apparent from the ensuing disclosure and appended claims.

SUMMARY OF THE INVENTION

One aspect of the invention involves a flexible tube formed of multilayer film comprising an inner layer, a barrier layer with its inner side adhered to the outer side of the inner layer, and an outer layer with its inner side adhered to the outer side of the barrier layer. The improvement comprises an inner layer formed of a blend comprising between about 30% and about 75% by weight ethylene vinyl acetate having at least about 3% by weight vinyl acetate. The other essential component of this blend is between about 25% and about 70% by weight of an unneutralized copolymer of an alpha-olefin having the formula $RHC=CH_2$ wherein R is H or $C_1$ to $C_8$ alkyl and an alpha, beta-ethylenically unsaturated carboxylic acid. This unneutralized copolymer is preferably ethylene acrylic acid. At least the inner layer is irradiated at dosage of at least about 2 MR.

Another aspect of the invention relates to a meat product package comprising an enclosing multilayer film having an inner layer and an insitu aqueous medium-cooked meat product with its outer surface in adhering relation to the inner layer. The multilayer film comprises at least three layers including a barrier layer as the core. The inner layer is formed of a blend comprising between about 30% and about 75% by weight ethylene vinyl acetate having at least about 3% by weight vinyl acetate, and between about 25% and about 70% by weight of an unneutralized copolymer of an alpha-olefin having the formula $RHC=CH_2$ wherein R is H or $C_1$ to $C_8$ alkyl and an alpha, beta-ethylenically unsaturated carboxylic acid. At least the inner layer is irradiated at dosage of at least about 2 MR. The meat product is preferably boiled ham containing at least about 10% fat on a weight basis. It also preferably contains on a weight basis more than about 5% collagen meat protein of the total available meat protein.

A further aspect of the invention relates to a method for preparing a cooked meat product including the step of providing a tube formed of multilayer film comprising the aforedescribed flexible tube. One end of the tube is sealed and the tube is then stuffed with uncooked meat so that the meat outer surface is in direct contact with the inner surface of the inner layer. The open end of the uncooked meat-containing tube is sealed and the meat cooked in the sealed tube by contacting the stuffed tube outer surface with a heated aqueous medium. The meat outer surface is adhered to the tube inner surface during the cooking.

In a preferred embodiment of all aspects of the invention, at least 4 grams/1000 ft.$^2$ of starch particles having major dimensions less than about 100 microns are substantially uniformly dispersed across the inner surface of the inner layer and integral therewith, in direct contact with the meat product outer surface. The starch particles are irradiated along with the inner layer.

As will be demonstrated, this invention provides good adhesion between the high fat and/or high collagen-type cooked meat and the film inner layer inner surface, little fat-out, good interlayer adhesion when the film is removed from the insitu cooked meat product, requires no more than three layers in the multilayer film forming the flexible tube, and relatively low irradiation level.

Definitions

As used herein, the terms set forth below will be understood to have the following meanings:

"Copolymer" includes terpolymers.

"Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Cook-in" refers to packaging material structurally capable of withstanding exposure to long and slow cooking conditions while containing a food product for insitu cooking, for example submersion in water at 70–80° C. for 4–6 hours, or cooking in steam. Cook-in packaged meats are essentially pre-packaged, pre-cooked meats which are directly transferred to the retailer in this form. These types of meats may be consumed with or without warming. Cook-in packaging materials maintain seal integrity and in the case of multilayer films, are delamination resistant. Cook-in films are preferably heat shrinkable under cook-in conditions so as to form a tightly fitting package. In the present invention they must also adhere to the cooked meats, thereby preventing cook-out.

"Meat product" means edible food containing meat.

"Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

"Integral" relationship between the dispersed starch particles and the inner surface of the EVA-unneutralized copolymer blend inner layer means that the starch particles do not separate from this surface during routine handling of the film, as for example forming the tubular film into a shirred stick for marketing and thereafter deshirring same for stuffing with meat product.

DETAILED DESCRIPTION

The unneutralized copolymer comprising one of the essential components of the film inner layer is a copolymer of an alpha-olefin having the formula $RHC=CH_2$ wherein R is H or $C_1$ to $C_8$ alkyl and an alpha, beta-ethylenically unsaturated carboxylic acid. Preferably the olefin is ethylene and the carboxylic acid is acrylic acid or methacrylic acid. Most preferably the unneutralized copolymer is ethylene acrylic acid. Suitable unneutralized copolymers may be the PRIMACOR TM materials supplied by Dow Chemical Company, Midland, Mich. Primacor is produced by the free radical copolymerization of ethylene and a carboxylic acid comonomer therefor such as acrylic acid or methacrylic acid. A preferred Primacor copolymer is Primacor 1410XT. A similar product is the Nucrel resins made by DuPont, Inc. consisting of a copolymer of ethylene with methacrylic acid.

As regards the preferred ethylene acrylic acid copolymer, an acid content of between about 5 and 20 wt% is suitable and preferably less than 10 wt% because of governmental restrictions on direct contact with food. The acid content of Primacor 1410XT is about 9.5 wt%. A melt index of between about 0.2 and 10 is suitable and for processing ease and a value of between about 1 and 3 is preferred. Primacor 1410XT has a melt index of 1.5 dg/min as measured by ASTM method D-1238. Other physical properties of Primacor 1410XT are reported by the manufacturer as follows:

Density —0.938 gm/cc per ASTM D-792
Vicat Softening—178° F. (81° C.) per ASTM D-1525
Tensile Yield—1210 psi per ASTM D-638
Ultimate Tensile—3400 psi ASTM D-638
Ultimate Elongation—585% per ASTM D-638

The present invention requires that the inner layer of the film package comprise a blend of ethylene vinyl acetate copolymer (EVA) and at least one of the aforedescribed unneutralized copolymers (hereinafter referred to as EAA) wherein the EAA content is between about 25% and about 70% by weight. Lower EAA content does not provide the substantially higher meat adhesion achievable when the EAA comprises at least about 25% by weight of the blend (compared to 100% EVA). On the other hand, EAA content above about 70% by weight provides high adhesion but tends to delaminate when one attempts to separate the film from insitu cooked high fat and/or high collagen meat product. That is, with higher than about 70% EAA in the inner layer, at least a portion of the inner layer may delaminate from the barrier core layer and remain on the meat surface. This would be objectionable to the consumer. A preferred range for EAA content between about 30% and about 40% by weight.

The inner layer of the multilayer film of this meat product package is in direct, adhesive contact with the cooked meat on one side and for a three layer film embodiment the inner layer is contiguously associated with the core layer on its other side. Even if the film has more than three layers, this other side of the film inner layer must be integral with another film layer so as not to delaminate under the aqueous medium cook-in conditions. The film inner layer is also primarily responsible for processibility of this film, for example affording the needed stretchability for biaxial orientation when a high shrink film is desired.

The thickness of the inner layer is preferably between about 0.5 and about 2.0 mils. Thinner layers may not perform the aforedescribed functions while thicker layers do not appreciably improve processability of the film and may reduce total film performance.

The EVA component of the film inner layer has at least about 3% and preferably between about 3% and about 18% by weight vinyl acetate (VA). The vinyl acetate content of the EVA should be at least about 3 weight % to provide the desired high shrink and adhesion to the contiguous layer, but preferably no higher than about 18 weight % to allow the preferred biaxial orientation and cook-in performance. Higher vinyl acetate content makes the film excessively soft and not capable of biaxial orientation. A most preferred balance between these characteristics is a vinyl acetate content of between about 6% and about 18% of the ethylene vinyl acetate.

The melt index of the ethylene vinyl acetate inner layer is preferably between about 0.1 and 1.0. Lower melt indexes are undesirable because the resulting high viscosities make extrusion very difficult, whereas higher melt indexes are to be avoided because orientation strength is diminished.

In a preferred embodiment, the film inner layer should contain at least about 4 grams/1000 ft.$^2$ of starch particles having major dimensions less than about 100 microns and being substantially uniformly dispersed across the inner surface of the inner layer and integral therewith. Starch loadings of at least about 8 grams/1000 ft.$^2$ are more preferred to compensate for possible nonuniformities in particle distribution on the EVA-EAA blend substrate. Loadings above about 25 grams/1000 ft.$^2$ are undesirable because all of the starch particles may not be retained by the available surface, and loose starch should not be present during conversion of the film, ie. shirring or bag fabrication and/or stuffing of the film with meat product. A range of between about 10 and 14 grams/1000 ft.$^2$ is a most preferred balance of these characteristics.

The major dimensions of the starch particles should be less than about 100 microns so that the particles are maintained in integral relation with the EVA-EAA blend surface during processing, and preferably less than about 50 microns for the same reason.

Starch is commercially available as a white, odorless granular or powdery material, and chemically is a complex carbohydrate of the formula $(C_6H_{10}O_5)_x$ where x may be about 250–4000. Starch derived from corn ("corn starch") is preferred because its particle size and shape makes it easy for even dispersion on the film surface. Other starches as for example those derived from potatoes, rice or other plants may also be used.

The starch particles must be substantially uniformly dispersed across the inner surface of the EVA-EAA blend inner layer, and integral therewith. This is preferably achieved by applying the starch particles to the hot EVA-EAA blend surface as an integral part of a coextrusion process forming the multilayer film. Alternatively, dispersion may be accomplished by dusting the starch particles on the cooled EVA-EAA blend surface.

At least the inner layer blend of the instant multilayer film is irradiated at dosage of at least about 2 MR. This is necessary to provide the meat adhesion characteristic. Irradiation also improves inner layer-barrier layer bonding and film strength at cook-in conditions. Lower irradiation levels do not provide these characteristics to the extent required for the cook-in meat product package. The irradiation dosage is preferably below about 5 MR as higher levels tend to degrade the elongation properties of the film.

Although only the inner layer need be irradiated, it is preferred to irradiate the entire film so as to maximize film strength and interlayer adhesion. This may be performed prior to biaxial orientation but is preferably done after this step on the stretched and thinner film. Alternatively, if only the inner layer is to be irradiated the multilayer film may be fabricated in the manner described in U.S. Pat. No. 3,741,253. This involves first extruding the EVA-EAA blend inner layer, irradiating this layer and then forming the other nonirradiated layers thereon. In this instance adhesives may be required to provide the needed interlayer adhesion.

The outer layer of the enclosing multilayer film is on the opposite side of the core layer from the inner layer, and in the preferred three layer embodiment the outer layer is both directly adhered to the core layer and in direct contact with the environment including the aqueous heating medium (either steam or water) during cook-in. Since it is seen by the use/consumer, it must enhance optical properties of the film. Also, it must withstand contact with sharp objects so is termed the abuse layer and provides abrasion resistance.

The outer layer is preferably formed of ethylene vinyl acetate, and more preferably with the same range of between about 3% and about 18% vinyl acetate content for the same reasons as in the inner layer. Also, the melt index of the EVA outer layer is preferably between about 0.1 and about 1.0 for the same reasons previously discussed in connection with the inner layer.

Alternatively, the outer layer may be formed of other thermoplastic materials as for example polypropylene, ethylene - propylene copolymer, ionomer or a member of the polyethylene family such as linear low density polyethylene (LLDPE), very low or ultra low density polyethylene (VLDPE and ULDPE) respectively, or blends of these materials.

The outer layer thickness is preferably between about 0.5 and 1.0 mils. Thinner layers may be less effective in performing the abuse resistance projection, while thicker layers may reduce film stretchability.

The functional requirement of the barrier layer is that together with the other layers it must provide an oxygen transmission rate through the entire multilayer film below about 5 cc/100 in.$^2$/ 24 hrs/Atm. This is necessary to avoid spoilage of the meat enclosed in the cook-in film package due to oxygen passage from the environment through the film wall. This requirement may be satisfied by numerous well-known barrier layer materials as for example certain of the polyamides (nylon), hydrolyzed ethylene vinyl acetate copolymer (EVOH) and preferably a vinylidene copolymer, most preferably a vinylidene chloride-methyl acrylate copolymer ie. MA-VDC. The reasons why an MA-VDC type barrier layer is preferred is that the oxygen barrier property is not affected by moisture, adhesive layers are not required and discoloration during cooking is minimal.

The barrier layer thickness is preferably between about 0.1 and about 0.5 mils. Thinner barrier layers may not perform the intended function and thicker layers do not appreciably improve performance for the cook-in function.

The thickness of the aforedescribed three layer film is preferably between about 2.0 and 3.5 mils. Lower thicknesses reduce the effectiveness of at least one of the three layers in performing the aforedescribed functions, while higher thicknesses reduce the film flexibility and do not appreciably improve its performance.

In general, various conventional additives such as slip agents and pigments can be incorporated in the film in accordance with conventional practice.

While this invention is specifically described in terms of three layers, it should be understood that one or more additional layers may be directly adhered to the inside or outside of the outer layer or between the barrier layer and the inner layer, but not inside the inner layer. For example, a fourth layer may be interposed between the EVA layer and the barrier layer. This fourth layer may for example be LLDPE, VLDPE, polypropylene, nylon, ionomer, or blends thereof.

The multilayer film of this invention is preferably manufactured in tubular form by simultaneous coextrusion of the three layers using the conventional double bubble technique. This primary tube is biaxially oriented by stretching with internal pressure in the transverse direction and with the use of pinch rolls at different speeds in the machine direction. Then the bubble is collapsed. After cooling, the biaxially oriented tube is flattened and guided through an ionizing radiation field at a dosage of at least about 2 MR.

The stretch ratio in the biaxial orientation is preferably sufficient to provide a multilayer film with total thickness of between about 1.5 and 3.5 mils. A stretch ratio (MD stretch multiplied by TD stretch) of about 8-25:1 will impart a shrink capacity of about 30-35% biaxial free shrinkage at 90° C (based on ASTM D2732).

The multilayer film is preferably wound up as flattened, seamless, tubular film. The cook-in tubes may then be formed into bags by end seals, typically made by clips or by transverse heat sealing across the width of flattened tubing followed by severing the tubing so that the transverse seal forms the bag bottom. Alternatively side-seal bags may be formed in which the transverse seals form the bags sides and one edge of the tubing forms the bag bottom, or the tubular stock may be slit into sheet stock for further forming into back-seamed tubes by forming an overlap or fin-type seal.

To prepare the meat product package, cook-in tubes (casings) fabricated from the aforedescribed multilayer film are used by placing the uncooked meat in the tube, and sealing the open portion as by clipping. The meat-containing tube is then ready for cooking as described hereinafter.

The following examples illustrate certain embodiments of the invention and compare same with prior art meat packages.

EXAMPLE 1

In this example, flexible tubes of about 8½ inches flat width three layer films comprising samples 1-4 were prepared by coextrusion into structures including various inner layers of 1.7 mil thickness, and identical barrier layers and outer layers. The barrier was a 0.3 mil thick layer formed of a blend comprising vinylidene chloride-vinyl chloride copolymer and vinylidene chloride methyl acrylate copolymer. The methyl acrylate comprised 6 wt.% and the vinyl chloride comprised 7.2 wt.% of the blend. The outer layer was formed from a blend of 75 wt.% ultra low density polyethylene of 0.912 density having a melt index of 1.0 (prepared from Dow Chemical Company resin product Attane 4001) and 25 wt.% EVA having a melt index of 0.25 (prepared from DuPont resin product Elvax 3135X). The outer layer had a thickness of about 0.8 mil, so that the total film thickness was about 2.8 mils. For all samples, 12 gms/1000 ft.$^2$ film surface area of OxyDry C-5 corn starch powder (manufactured by OxyDry Corporation) was applied to the hot inner layer through the extrusion die as a substantially uniform dispersion of particles having major dimensions of about 15 microns particle size.

Sample 1 had a 100% EVA inner layer with vinyl acetate content of 10 wt% and melt index of 0.25 (prepared from Union Carbide Corporation resin product 6833). Sample 2 had an inner layer comprising a blend of 50 wt% EVA identical to that used in Sample 1, and 50 wt% ionomer (prepared from DuPont Company resin product Surlyn 1601). Sample 3 had an inner layer comprising a blend including 50 wt% EVA with vinyl acetate content of 18 wt% and melt index of 0.7 (prepared from DuPont Company resin product 3165). The other constituent of the Sample 3 inner layer blend was 50 wt% ethylene acrylic acid copolymer (the aforementioned Primacor 1410-XT). Sample 4 had an inner layer comprising a blend of 65 wt% EVA identical to that used in Sample 1 and 35 wt% of the same ethylene acrylic acid copolymer used in Sample 3. Sample 5 was a commercially used cook-in film manufactured by W. R. Grace Company's Cryovac Division and sold with a product designation CN-510. This 3.5 mils thick film has an inner ionomer layer and is believed to comprise a total of six layers, as generally described in the aforementioned U.S. Pat. No. 4,469,742. The individual layers are probably as follows, ionomer (inner)/EVA/adhesive/EVOH/adhesive/ EVA (outer).

After biaxial orientation, the Sample 1-4 films were irradiated to a dosage of about 4MR. These tube samples along with Sample 5 were then clipped at one end and stuffed with ground ham trim and shank meat. The latter primarily comprised particles of about 5/64 inch size having protein content of about 11-12% and fat content of about 21-22%. The stuff temperature was 47° F.

Five 10 lb. (precooking weight) product meat packages were made from each film type. The tubes were stuffed on a Tipper Tie RS 4201 type commercial stuffing machine to a circumference equal to twice the tube flat width. The stuffed tubes lengths were 12.5-13.0 inches and placed in molds 12½ inches long, 4¾ inches wide and 5½ inches deep. A 160° F. water bath was used to cook the hams for 4¾-5 hours to an internal temperature of 152° F. The cooked ham was cooled to an internal temperature of 70° F. and then separated from the molds.

All meat product packages were tested for meat adhesion. In this test the meat product package was fastened to a horizontal plane which was affixed to the crosshead of the aforedescribed commercially available testing machine. A one inch wide by six inch long test specimen was slit in the meat product package. A clamp connected to the load cell of the testing machine by means of a low friction pulley was attached to one end of the test specimen. The test was initiated by lowering the plane at a rate of 10 inches per minute, and the force required to pull the test specimen at a 180° angle from the encased meat was the "meat adhesion". Four samples were tested from each meat product package, and the results averaged. Adhesion was also evaluated by weighing the amount of meat adhered to the film inner layer inner surface after removal from the cooked meat. A third approach to adhesion evaluation was to weigh all of the material (i.e., "purge") comprising liquid and solid, accumulating between the cooked meat outer surface and the film inner surface, which material was released and collected when the film was separated from the meat.

The results of these tests are summarized in Tables A and B.

TABLE A

| | Adhesion Quantity | | |
|---|---|---|---|
| | | Cook-Out Fluid | |
| Sample No. | Adhered Meat mg/cm$^2$ | (gm) | (% Product Weight) |
| 1 | 2.42 | 106.5 | 2.33 |
| 2 | 3.30 | 93.4 | 2.03 |
| 3 | 7.18 | 45.7 | 0.98 |
| 4 | 10.26 | 14.0 | 0.30 |
| 5 | 11.01 | 8.9 | 0.20 |

TABLE B

| | Removal Force | |
|---|---|---|
| Sample No. | Inner Layer | Meat Adhesion (gms) |
| 1 | 100% EVA (10% VA) | 28 |
| 2 | 50% EVA (10% VA), 50% ionomer | 33 |
| 3 | 50% EVA (18% VA), 50% EAA | 48 |
| 4 | 65% EVA (10% VA), 35% EAA | 52 |
| 5 | 100% ionomer | 55 |

Inspection of Tables A and B indicates that Sample 4, the preferred embodiment of this invention with a 65% EVA-35% EAA blend inner layer is far superior in all aspects of adhesion to Sample 1, the 100% EVA inner layer. That is, the quantity of adhered meat was much higher, the quantity of cook-out fluid much lower, and the adhesive removal force much higher. These values for Sample 4 are very similar to those of Sample 5, the 100% ionomer inner layer type six layer film widely used as a cook-in film for differently adhering high fat and/or high collagen meats. This performance is remarkable in view of the much simpler and less expensive three layer characteristic of Sample 4.

Tables A and B also show that invention embodiment Sample 4 is much superior to the 50% EVA-50% ionomer inner layer type Sample 2. This was surprising because ionomer-type compositions are widely believed to provide superior meat adhesion characteristics to EVA-based compositions.

Finally, Tables A and B show that by a comparison of Samples 3 and 1, even higher EAA contents in the EVA-EAA blend inner layer still provide substantially improved meat adhesion properties over a 100% EVA inner layer. It should also be noted that whereas Sample 4 utilized 10% VA in the EVA blend component, Sample 3 employed 18% VA in the EVA blend component of the inner layer. However, differences in VA content of the EVA blend component do not appear to affect meat adhesion.

EXAMPLE 2

In this example, flexible tubes of about 8½ inches flat width diameter comprising Samples 6-9 and 11 were prepared by coextrusion into three layer structures including various inner layers and identical barrier layers and outer layers. The manufacturing method was substantially the same as Samples 1-4 (Example 1) and the barrier and outer layers were the same as described in Example 1. The EVA in the inner layers contained 10 wt% vinyl acetate. The thickness of the various layers were identical to Example 1 as was the starch powder dispersions and irradiation of the entire film after biaxial orientation.

Sample 6 had a 75% EVA-25% PLEXAR type 281 adhesive inner layer; the latter is a modified linear low density polyethylene material manufactured by Quantum Chemical Company. Sample 7 had an inner layer comprising 80 wt% EVA-20 wt% ultra low density polyethylene (manufactured from Attane 4001 resin sold by Dow Chemical Company and having 0.912 density). Sample 8 had a high vinyl acetate (18 wt%) type EVA inner layer. Sample 9 had an inner layer comprising a blend of 75 wt% EVA (10% vinyl acetate) and 25 wt% ethylene acrylic acid copolymer (the aforementioned Primacor 1410-XT). The aforedescribed W. R. Grace type CN-510 six layer film was Sample 10 and the 100% EVA (10% VA) inner layer, three layer film was used as control Sample 11.

Six flexible tubes prepared from each sample film were stuffed with chopped ham having particle size of about ⅛ inch. The stuffing equipment and procedure was the same as used in Example 1, and the meat was ham trim and shank meat with a final fat content of about 20%.

The insitu cooking procedure was the same as Example 1, the water bath was at a constant 160° F. temperature for 4¾ to 5 hours to an internal temperature of 152° F. The molds were water cooled to a temperature of about 70° F.

The cooked product samples were qualitatively evaluated in terms of "mean purge score" based on the following scale:

0: no visible cook-out fluid
0.5: cook-out fluid present at clip gatherings and surface voids only 1.0: cook-out fluid on one but less than four corners
1.5: cook-out fluid on four or more corners but isolated to corners only
2.0: cook-out fluid on all corners extending down longitudinal edges but not their entire length
2.5: cook-out fluid on all corners extending down entire length of one longitudinal edge

TABLE C

| Sample No. | Inner Layer | Mean Purge Score |
|---|---|---|
| 6 | 25% modified LLDPE - 75% EVA | 2.4 |
| 7 | 20% VLDPE - 80% EVA | 2.3 |
| 8 | 100% EVA (18% VA) | 1.9 |
| 9 | 25% EAA - 75% EVA (10% VA) | 1.5 |
| 10 | 100% ionomer | 0.3 |
| 11 | 100% EVA (10% VA) | 1.9 |

Mean Purge Scores

On the basis of mean purge scores, meat adhesion of the Sample 9 invention embodiment was somewhat better than Sample 11 with a 100% EVA inner layer.

Meat adhesion was also evaluated by visual inspection of the meat particles on the film inner layer after peeling from the cooked meat product. Meat particles adhered to the entire outer surfaces of Samples 9 and 10 (the latter being the prior art six layer film with a 100% ionomer inner layer) except where cook-out appeared on Sample 9. Most importantly, the size of adhered meat particles was about the same for the two samples. This suggests that the meat adhesion was similar even though the purge score was higher for the EVA-EAA blend sample. In contrast, the meat particles adhered to the surface of 100% EVA Sample 11 were noticeably smaller, indicating poorer adhesion. The meat particles adhered to the surface of 25% modified LLDPE-75% EVA Sample 6 and 20% ULDPE-80% EVA sample 7 were about the same size as Sample 11. It is concluded from the foregoing that even with only 25% EAA in a blend with EVA, substantially better meat adhesion is realized and that the adhesive force approaches that of a 100% ionomer surface which is widely used as an adhesive in multilayer films with more than three layers.

EXAMPLE 3

In this example, flexible tubes of about 8¾ inches flat width diameter comprising Samples 12-15 were prepared by coextrusion into multilayer film structures having various inner layers and identical barrier layers and outer layers. The manufacturing method for Samples 12-15 was substantially the same as Samples 1-4 (Example 1) and the barrier and outer layers were identical to those described in Example 1. The EVA in the inner layers contained 10 wt% vinyl acetate. The thicknesses of the various layers were identical to Example 1 as was the starch powder dispersion and irradiation of the entire film after biaxial orientation.

Sample 12 had a 100% EVA inner layer, Sample 13 had an inner layer comprising a blend of 50 wt% ethylene acrylic acid (the aforementioned Primacor 1410-XT) - 50 wt% EVA, and Sample 14 had an inner layer comprising a blend of 75 wt% EAA (Primacor 1410-XT) - 25 wt% EVA. Sample 15 had an inner layer comprising a three component blend of 30 wt% EAA (Primacor 1410-XT), 10 wt% nylon (Grilon W 6220 manufactured by EMS Chemie) and 60 wt% EVA.

Sample 16 was the aforedescribed W. R. Grace type CN-510 six layer film with a 100% ionomer inner layer.

Five flexible tubes prepared from each sample film were stuffed with chopped ham having particle size of about ⅛ inch. The stuffing equipment and procedure was the same as used in Example 1, and the meat was primarily ham trim and shank meat. The fat content was 21% and protein content about 12.0%.

The insitu cooking procedure was the same as Example 1, i.e., water bath temperature of 160° F. for 4¾ to 5 hours to an internal temperature of 152° F. followed by cooling of the molds to an internal temperature of about 70° F.

Meat adhesion was evaluated in terms of purge percent, purge score and the force required to separate the film inner layer from the meat, all as previously described. The results of these tests are summarized in Table D.

TABLE D

| Sample No. | Inner Layer | High EAA Adhesion Purge (%) | Purge Score | Meat Adhesion (gm/in$^2$) |
|---|---|---|---|---|
| 12 | 100% EVA | 1.62 | 4.0 | 0.038 |
| 13 | 50% EVA 50% EAA | 0.20 | 2.0 | 0.093 |
| 14 | 25% EVA 75% EAA | 0.50 | 2.0 | 0.100 |
| 15 | 60% EVA 30% EAA 10% Nylon | 1.50 | 4.5 | 0.0085 |
| 16 | 100% Ionomer | 0.25 | 0.75 | 0.124 |

Table D shows that at high EAA contents in the two component blend inner layers (Samples 13 and 14) the meat adhesion was substantially improved over the 100% EVA inner layer (Sample 12). Moreover, this meat adhesion performance of the 50% EAA-50% EVA and 75% EAA - 25% EVA samples approached that of the more complicated and expensive six layer film with a 100% ionomer inner layer (Sample 16).

In spite of the superior meat adhesion properties of the 50% EAA-50% EVA and 75% EAA-25% EVA inner layer film samples, these particular samples are not suitable for insitu cooking of encased meat because of a delamination problem. After cooking and about 3 days storage at refrigerated temperature, the plastic tube-casings were stripped from the cooked ham. During this separation a portion of the Sample 13 and 14 inner layers delaminated from the vinylidene chloride copolymer core layer and remained on the meat surface. In commercial practice, this would be objectionable to the consumer because of the added time required to remove inner layer fragments from the meat, and also because of the possibility that some of the inner layer fragments would remain on the consumed meat.

Notwithstanding this problem, it should be noted that Sample 3 of Example 1 also employed a 50% EAA-50% EVA blend inner layer, but there was no delamination when the film was stripped from the meat. The reason for the difference is that the EVA of Sample 1 contained 18% vinyl acetate whereas the EVA of Samples 13 and 14 contained 10% vinyl acetate. There appears to be at least two reasons for this difference. Vinyl acetate is believed to provide higher interlayer adhesion than ethylene because of polarity differences, and higher vinyl acetate content also provides higher shrink on heating and probably imparts better balance between the inner layer and outer layer shrink forces.

Notwithstanding the improvement in delamination resistance by using higher vinyl acetate content in the EVA component of the inner layer blend, it is believed that delamination would be a problem with even high vinyl acetate content EVA when the ethylene acrylic acid portion of the inner layer blend exceeds about 70 wt%. This is because the smaller percentage of EVA (no more than about 30 wt%) and consequent smaller percentage of even high vinyl acetate content of this EVA would have less influence on the delamination resistance of the blended inner layer. Accordingly, in the practice of this invention the EAA content of the inner layer blend should not exceed about 70 wt%.

In Example 1 the meat particles stuffed in the flexible tubes were smaller than in Examples 2 and 3, i.e., 5/16 inch versus ⅛ inch particle size. In general, it is more difficult to keep the fat content emulsified in the insitu cooked product with small particles so from this standpoint larger meat particles on the order of ⅛ inch are preferred in the practice of this invention.

EXAMPLE 4

In this example, the physical properties of a three layer biaxially oriented heat shrinkable film of this invention with the preferred inner layer blend of 35% EAA (the aforementioned Primacor 1410-XT)-65% EVA (10 wt% vinyl acetate) as Sample 17 were compared with an otherwise identical film having a 100% EVA inner layer as Sample 18. The manufacturing method was substantially the same as Samples 1-4 (Example 1) and the barrier and outer layers were identical to those described in Example 1. The thicknesses of the various layers were identical to Example 1 as was the starch powder dispersion and irradiation of the entire films after biaxial orientation to 4MR.

The following test methods were used in determining the properties of film Samples 17 and 18. Film thickness was measured in accordance with ASTM Method D-2103. Secant modulus was determined in accordance with ASTM D-882, method A. Tensile strength and elongation values were obtained following ASTM Method D-882, procedure A. Haze was measured in accordance with ASTM Method D-1003, Procedure A, and gloss was measured accordance with ASTM Method D-523, 45° angle.

Non-ASTM test methods employed are described in the following discussion.

Shrinkage values were obtained by measuring unrestrained shrink at 90° C. for five seconds.

The dynamic puncture-impact test procedure is used to compare films for their resistance to bone puncture. It measures the energy required to puncture a test sample with a sharp bone end. A Dynamic Ball Burst Tester, Model No. 138, available from Testing Machines, Inc., Amityville, Long Island, N.Y., is used and a ⅝ inch diameter triangular trip, as aforedescribed, is installed on the tester probe arm and employed in this test procedure. Six test specimens approximately 4 inches square are prepared, a sample is placed in the sample holder, and the pendulum is released. The puncture energy reading is recorded. The test is repeated until 6 samples have been evaluated. The results are calculated in cm-kg per mil of film thickness.

The shrink force of a film is that force or stress required to prevent shrinkage of the film and was determined from film samples taken from each film. Four film samples were cut 1 inch (2.54 cm) wide by 7 inches (17.8 cm) long in the machine direction and 1 inch (2.54 cm) wide by 7 inches (17.8 cm) long in the transverse direction. The average thickness of the film samples was determined and recorded and a strip chart recorder was calibrated at 0 gram and at 1,000 grams full scale load. Each film sample was then secured between two clamps spaced 10 cm apart. One clamp is in a fixed position and the other is connected to a strain guage transducer. The secured film sample and clamps were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the result is obtained in grams per mil of film thickness (g/mil):

$$\text{Shrink Force (g/mil)} = \frac{F}{T}$$

wherein F is the force in grams and T is the average thickness of the film samples in mils.

The test results are summarized in Table E.

TABLE E

| Physical Properties | Sample 17 (35% EAA/ 65% EVA) | Sample 18 (100% EVA) |
|---|---|---|
| Thickness (average) in mils | 2.68 | 2.82 |
| Elongation at break (MD/TD) in % | 164/214 | 119/120 |
| Secant Modulus (MD/TD) in PSI × 100 | 27,372/ 27,309 | 30,075/ 30,923 |
| Shrinkage (MD/TD) at 90° C. in % | 34/44 | 33/44 |
| Shrink Force (MD/TD) at 90° C. in gm/mil | 109/126 | 167/144 |
| Hot Water Puncture TD at 95° C. in sec | 120+ | 120+ |
| Haze (in %) | 8.2 | 18.0 |
| Gloss at 45° angle | 74.8 | 63.3 |
| Shrink Force at 70° F. (in gm/mil) | 93/101 | 123/130 |
| Residual Shrink Force at 70° F. (in gm/mil) | 66/75 | 78/113 |

Table E shows that the physical properties of the film of this invention are similar to those of a comparative film commercially used for insitu meat cooking and having an inner layer of 100% EVA.

While certain embodiments of this invention have been disclosed hereinabove, those skilled in the art will appreciate that changes and modificiations may be made therein without departing from the spirit and scope of the invention.

What is claimed is:

1. In a flexible tube formed of multilayer film comprising an inner layer, a barrier layer as the core with its inner side adhered to the outer side of said inner layer and an outer layer with its inner side adhered to the outer side of said barrier layer, the improvement comprising an inner layer formed of a blend comprising between about 30% and about 75% by weight ethylene vinyl acetate having at least about 3% by weight vinyl acetate, and between about 25% and about 70% by weight of an unneutralized copolymer of an alpha-olefin having the formula $RHC=CH_2$ wherein R is H or $C_1$ to $C_8$ alkyl and an alpha, beta-ethylenically unsaturated carboxylic acid, at least said inner layer being irradiated at dosage of at least about 2 MR.

2. A flexible tube according to claim 1 wherein in said unneutralized copolymer, the olefin is ethylene and the carboxylic acid is acrylic acid or methacrylic acid.

3. A flexible tube according to claim 1 wherein said unneutralized copolymer is ethylene acrylic acid.

4. A flexible tube according to claim 1 wherein at least about 4 grams/1000 ft.$^2$ of starch particles substantially uniformly dispersed across the inner side of said inner layer and integral therewith, and said starch particles are irradiated along with said inner layer.

5. A flexible tube according to claim 4 wherein said starch is dispersed across said inner side at concentration between about 8 and about 25 grams/1000 ft.$^2$.

6. A flexible tube according to claim 1 wherein the core layer is a vinylidene chloride copolymer.

7. A flexible tube according to claim 3 wherein the core layer is a vinylidene chloride-methyl acrylate copolymer.

8. A flexible tube according to claim 1 wherein the core layer is a hydrolyzed ethylene-vinyl acetate copolymer.

9. A flexible tube according to claim 1 wherein the outer layer is ethylene vinyl acetate 10. A flexible tube according to claim 9 wherein the ethylene vinyl acetate outer layer has between about 6% and about 18% by weight vinyl acetate.

11. A flexible tube according to claim 1 wherein the ethylene vinyl acetate in said inner layer has a vinyl acetate content between about 6 and about 18%.

12. A flexible tube according to claim 1 wherein the ethylene vinyl acetate in said inner layer has a melt index between about 0.1 and about 1.0.

13. A flexible tube according to claim 1 wherein said unneutralized copolymer comprises between about 30% and about 40% by weight of said inner layer.

14. A flexible tube according to claim 3 wherein said ethylene acrylic acid comprises between about 30% and about 40% by weight of said inner layer.

15. A flexible tube according to claim 1 wherein the entire multilayer film is irradiated 16. A meat product package comprising an enclosing multilayer film having an inner layer and an insitu aqueous medium-cooked meat product with its outer surface in adhering relation to said inner layer, and with said multilayer film comprising at least three layers including a barrier layer as the core with its inner side adhered to the outer side of said inner layer and an outer layer with its inner side adhered to the outer side of said barrier layer, said inner layer being formed of a blend comprising between about 30% and about 75% by weight ethylene vinyl acetate having at least about 3% by weight vinyl acetate, and between about 25% and about 70% by weight of an unneutralized copolymer of an alpha-olefin having the formula $RHC=CH_2$ wherein R is H or $C_1$ to $C_8$ alkyl and an alpha, beta-ethylenically unsaturated carboxylic acid, with at least said inner layer being irradiated at dosage of at least about 2MR.

17. A meat product package according to claim 16 wherein in said unneutralized copolymer, the olefin is ethylene and the carboxylic acid is acrylic and or methacrylic acid.

18. A meat product package according to claim 16 wherein said unneutralized copolymer is ethylene acrylic acid.

19. A meat product package according to claim 16 wherein at least about 4 grams/1000 ft.$^2$ of starch particles having major dimensions less than about 100 microns are substantially uniformly dispersed across the inner surface of said inner layer and integral therewith in direct contact with the meat product outer surface, said starch particles being irradiated along with said inner layer.

20. A meat product package according to claim 19 wherein said starch is dispersed across said inner surface at concentration between about 10 and about 14 grams/1000 ft.$^2$.

21. A meat product package according to claim 16 wherein said unneutralized copolymer comprises between about 30% and about 40% of said inner layer.

22. A meat product package according to claim 18 wherein said ethylene acrylic acid comprises between about 30% and about 40% by weight of said inner layer.

23. A meat product package according to claim 19 wherein said starch is dispersed across said inner surface at concentration between about 8 and about 25 grams/1000 ft.$^2$.

24. A meat product package according to claim 16 wherein said meat product is boiled ham containing more than about 10% fat on a weight basis.

25. A meat product package according to claim 16 wherein said meat product is boiled ham containing on a weight basis more than about 5% collagen meat protein of the total available meat protein.

26. A meat product package according to claim 16 wherein said meat product is boiled ham containing 10% fat and more than about 5% collagen meat protein of the total available meat protein all on a weight basis.

27. A method for preparing a cooked meat product comprising the steps of:
a) providing a flexible tube formed of multilayer film comprising at least three layers including an inner layer, a barrier layer with its inner side adhered to the outer side of said inner layer, and an outer layer with its inner side adhered to the outer side of said barrier layer, with said inner layer formed of a blend comprising between about 30% and about 75% by weight ethylene vinyl acetate having at least about 3% by weight vinyl acetate, and between about 25% and about 70% by weight of an unneutralized copolymer of an alpha-olefin having the formula $RHC=CH_2$ wherein R is H or $C_1$ to $C_8$ alkyl and an alpha, beta-ethylenically unsaturated carboxylic acid, at least said inner layer being irradiated at dosage of at least about 2 MR;
b) sealing one end of said tube and stuffing said tube with uncooked meat so that the meat outer surface is in direct contact with said inner surface of said inner layer;
c) sealing the open end of the uncooked meat-containing tube; and
d) cooking said meat in the sealed tube by contacting the stuffed tube outer surface with a heated aqueous medium and simultaneously adhering the cooked meat outer surface to the tube inner surface.

28. A method according to claim 27 wherein in said unneutralized copolymer, the olefin is ethylene and the carboxylic acid is acrylic acid or methacrylic acid.

29. A method according to claim 27 wherein said unneutralized copolymer is ethylene acrylic acid.

30. A method according to claim 27 wherein at least about 4 grams/1000 ft.$^2$ of starch particles having major dimensions less than about 100 microns are substantially uniformly dispersed across the inner surface of said inner layer and integral therewith in direct contact with the meat product outer surface, said starch particles being irradiated along with said inner layer.

31. A method according to claim 30 wherein said starch is dispersed across said inner surface at concentration between about 10 and about 14 grams/1000 ft.$^2$.

32. A method according to claim 27 wherein said meat product contains at least about 10% fat on a weight basis.

33. A method according to claim 27 wherein said meat product is boiled ham containing on a weight basis more than about 5% collagen meat protein of the total available meat protein.

34. A method according to claim 27 wherein said meat product is boiled ham containing more than about 10% fat and more than about 5% collagen meat protein of the total available meat protein, all on a weight basis.

35. A method according to claim 27 wherein said unneutralized copolymer comprises between about 30% and about 40% of said inner layer.

36. A method according to claim 29 wherein said ethylene acrylic acid comprises between about 30% and about 40% of said inner layer.

37. A method according to claim 27 wherein the vinyl acetate content of said ethylene vinyl acetate is between about 6% and about 18% on a weight basis.

38. A method according to claim 27 wherein the entire multilayer film is irradiated.

* * * * *